United States Patent [19]

Underbrink

[11] Patent Number: 5,156,507
[45] Date of Patent: Oct. 20, 1992

[54] EXPANSIBLE FASTENING DEVICE

[75] Inventor: John M. Underbrink, Olympia, Wash.

[73] Assignee: Northwest Design Products, Olympia, Wash.

[21] Appl. No.: 692,675

[22] Filed: Apr. 29, 1991

[51] Int. Cl.⁵ ............................................. F16B 13/06
[52] U.S. Cl. ......................................... 411/63; 411/68; 411/80
[58] Field of Search .................. 411/55, 18, 63, 64, 411/68, 67, 73, 80, 108, 44, 45, 57, 60, 65, 69, 71, 72, 78, 103

[56] References Cited

U.S. PATENT DOCUMENTS

| | | | |
|---|---|---|---|
| 137,338 | 4/1873 | Bartlett | 411/63 |
| 606,925 | 7/1898 | Held | 411/63 X |
| 688,756 | 12/1901 | Tripp . | |
| 754,764 | 3/1904 | Gottshalk | 411/63 |
| 1,000,715 | 8/1911 | Caywood . | |
| 1,025,275 | 5/1912 | Kennedy . | |
| 1,028,743 | 6/1912 | Lakhovsky . | |
| 1,116,545 | 6/1914 | Barrett . | |
| 1,138,345 | 5/1915 | Zifferer . | |
| 1,248,007 | 11/1917 | Pleister | 411/63 |
| 1,304,065 | 5/1919 | Kennedy . | |
| 1,392,108 | 9/1921 | Bilterman . | |
| 1,407,782 | 2/1922 | Church et al. | 411/68 |
| 1,625,013 | 4/1927 | Zifferer | 411/68 |
| 2,033,100 | 10/1932 | Kellogg . | |
| 3,916,480 | 11/1975 | Smith | 411/63 X |

FOREIGN PATENT DOCUMENTS 2434502  1/1976  Fed. Rep. of Germany ........ 411/68

*Primary Examiner*—Rodney M. Lindsey
*Attorney, Agent, or Firm*—Christensen, O'Connor, Johnson & Kindness

[57] ABSTRACT

Disclosed is an expansible fastening device (10) for placement in a hole preformed in a base member for use in attaching a component part to the base using a conventional nut (24) and bolt (26). The fastening device includes a fastener body (12) having two body sections (28a, and 28b). The body sections when positioned together form a central cavity (30) within the fastener body which encloses and retains the nut and a wedge (14). Each longitudinal section includes a fin (16) which extends longitudinally and projects radially outward from the central region of each body section. Further, each body section includes primary and secondary teeth (18 and 20) which extend circumferentially about the outer surface of the sections. In operation the bolt is engaged with the nut and rotated, pushing the wedge from the fastening device. As the wedge is driven away from the nut, the teeth and fins are driven into the base member.

15 Claims, 4 Drawing Sheets

EXPANSIBLE FASTENING DEVICE

TECHNICAL FIELD

The present invention relates to expansible fastening devices and, more particularly, to an expansible fastening device for securing one or more component parts to a base member comprised of wood or other material that is subject to splitting or cracking.

BACKGROUND OF THE INVENTION

Expansion bolts typically include a body having a threaded portion for receiving a bolt and an expansible portion which expands when engaged by the threaded end of the bolt. Alternatively, an expansion bolt can include a plug or other element which is driven by the bolt to spread apart the expansible portion of the body. To use an expansion bolt to attach a component part to a base member, the expansible portion of the device is inserted in a hole that is formed in the base member. The bolt is installed to secure the body of the device to the base.

In general, expansion bolts primarily rely upon radial pressure and friction that is exerted on and by the wall of the preformed hole to keep the device and attached component parts secured to the base. Although often satisfactory, securement by radial pressure and friction can be undesirable when using the bolt in a relatively soft or impressible material such as wood. Specifically, expansion bolts often cause a wood base to split along the wood grain, especially if two or more expansion bolts are installed in relatively close proximity.

Various attempts have been made to provide an expansible fastening device that minimizes or eliminates cracking and splitting of the base member in which the device is installed. Although some progress has been reported, a need exists for a fastening device that can be firmly secured in wood or other such material in a manner that does not create crack-causing internal stress, yet achieves high strength fastening (i.e., substantial load bearing capabilities). To provide economical and widespread application, such a fastening device must be relatively inexpensive and easily used in a wide variety of fastening situations.

SUMMARY OF THE INVENTION

A fastening device in accordance with the present invention provides a relatively inexpensive and efficient device for securely connecting one or more component parts to a base member. The fastening device of the present invention includes a fastener body that is formed by two substantially identical body sections that are positioned in longitudinal registration with one another prior to installation of the fastening device. A conventional nut is retained in a cavity that is formed within the fastener body, with the nut being at one end of the fastener body and being accessible for threaded engagement by a conventional bolt. Also located within the interior cavity of the fastener body is a wedge. The wedge is housed within a region of the cavity that is of matching geometry, with one face of the wedge being positioned in abutment with the nut. When a conventional bolt is engaged with the nut and rotated, the end of the bolt comes into contact with the wedge and presses the wedge away from the nut, in turn, pushing the two body sections apart from one another.

The fastener body of the present invention is configured and arranged for expansion within a cylindrical bore that is formed in the base member to which the fastening device is to be installed. In this regard, the end of the fastener body at which the nut is located is of circular cross sectional geometry, having a diameter that is substantially equal to the bore in which the fastening device is installed. Located at the distal end of the fastener body is a relatively thin primary tooth that extends radially from the fastener body and has a diameter substantially equal to the diameter of the bore in which the fastening device is installed. A secondary tooth having a diameter substantially equal to the primary tooth is located in spaced apart relationship with the primary tooth. Extending longitudinally along the fastener body are a pair of relatively thin fins that are oppositely disposed from one another. The fins extend radially outward beyond the cross sectional periphery of remaining portions of the fastener body cross sectional geometry.

When the present invention is installed in a suitably sized bore, the fins penetrate the wall of the bore. To minimize the stress created in the base member and thus minimize the risk of cracking or splitting, the fins are positioned substantially in line with the grain of the base member. When the bolt is rotated, the wedge is driven axially away from the end of the fastening device that includes the nut. Since the end of the fastening device that includes the nut is substantially the same size as the bore, the wedge forces the distal ends of the two body sections away from one another. As the distal ends of the body sections are forced away from one another, the fin and the primary and secondary teeth located on each of the body sections are embedded in the base member thereby securing the fastening device.

In the currently preferred embodiments of the invention, the exterior surface of each body section is contoured so that it contacts the wall of the bore in which the fastening device is expanded. Further, in the preferred embodiments, a pair of tabs is included on one of the body sections. When the nut and wedge are placed in the fastener body cavity and the two body sections are positioned in longitudinal registration, the tabs are deformed inwardly to hold the fastening device together so that it can easily be installed. In addition, the end of the fastener body that includes the nut is configured so that portions of the fastener body extend beyond the wall of the bore in which the fastening device is to be installed. These projections serve as "stops" that prevent the fastening device from being inserted too deeply within the bore.

BRIEF DESCRIPTION OF THE DRAWINGS

The various features and advantages of the invention will be understood in view of the following description taken in conjunction with the accompanying drawings in which.

DETAILED DESCRIPTION

Figure 1:
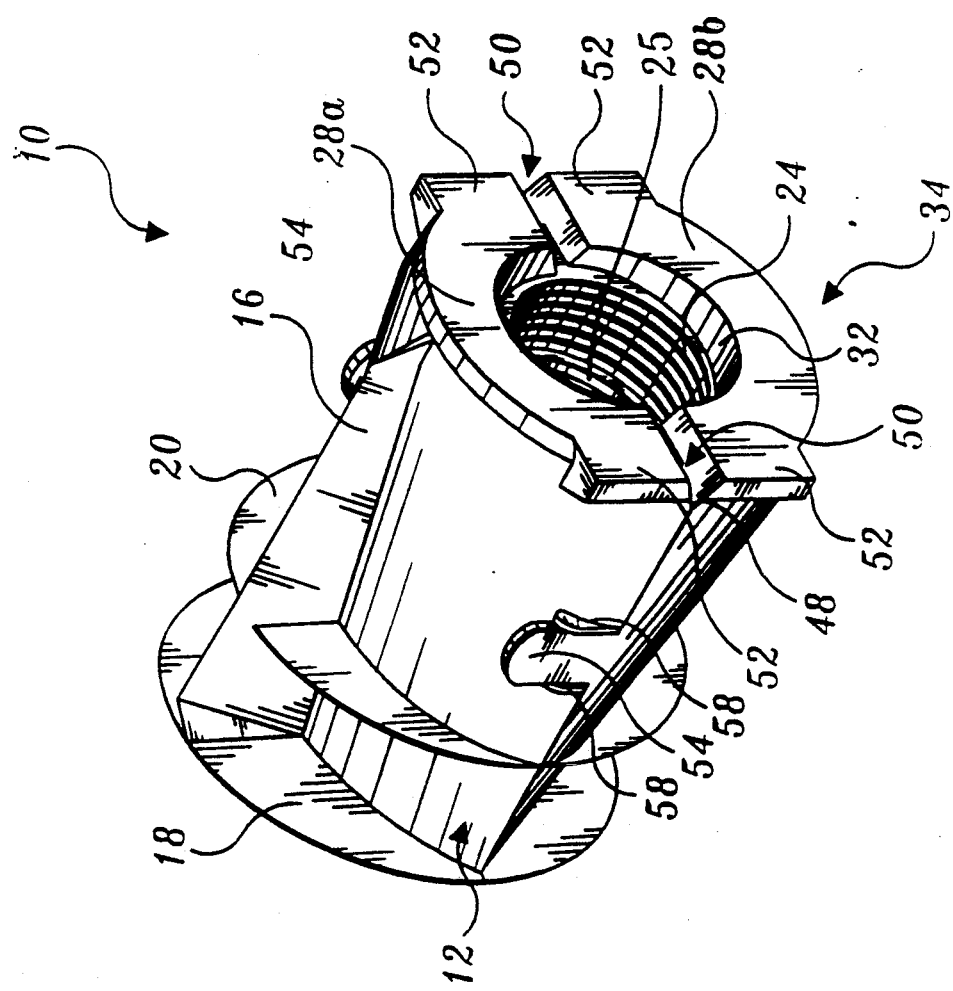
FIG. 1 is a perspective view of an expansible fastening device that is constructed in accordance with the invention.
Figure 2:
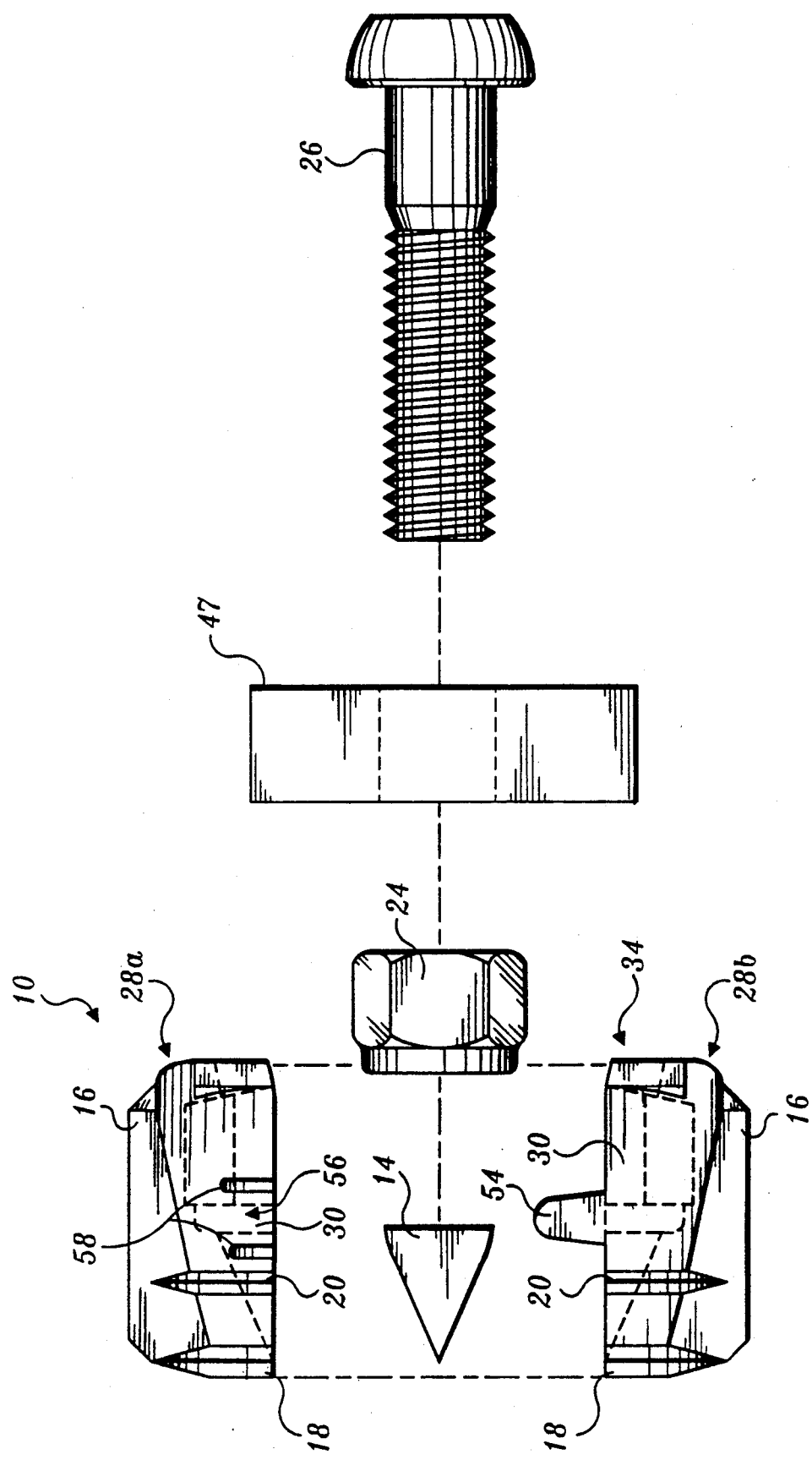
FIG. 2 is an exploded view of the fastening device of FIG. 1 along with a nut and bolt for installing the fastening device to a base member.

In accordance with the present invention, the expandible fastening device provides an effective means for attaching a component part to a preformed hole in a base of wood without causing undue stress on the wood. With reference to FIGS. 1 and 2, an expandible fastening device of this invention (generally) denoted by reference numeral 10) includes a fastener body 12, a wedge 14, a pair of fins 16, a primary tooth 18 and a secondary tooth 20. The fastening device 10 is used in conjunction with a conventional nut and bolt (24 and 26, respectively). The nut 24 preferably has a locking feature e.g., a nylon ring or uneven threads, to provide resistance against vibration of the bolt 26 out of the nut. The locking feature is shown as a nylon ring 25 in FIG. 1.

Fastener body 12 of the fastening device 10 is formed by two substantially identical body sections 28a and 28b. Extending longitudinally along and projecting radially outward from the central region of each body section 28a and 28b is one of the fins 16. Located at one end of each body section 28a and 28b are two spaced apart, circumferentially extending flanges which define one-half of the primary tooth 18 and one-half of the secondary tooth 20. When positioned together, the body sections 28a and 28b form a central cavity 30 within fastener body 12 that encloses and retains wedge 14 and nut 24. When placed in central cavity 30, nut 24 coaxially surrounds the longitudinal centerline of fastener body 12 at a position near the end of the fastener body that does not include the primary and secondary teeth 18 and 20 (i.e., end 34 in FIGS. 1 and 2). Wedge 14 is retained proximate to nut 24, with the pointed end of the wedge being directed along the axial centerline of fastener body 12 and away from nut 24. An aperture 32 formed in end 34 of the fastener body 12 allows bolt 26 to pass into and engage the threads of nut 24.

Figure 3:
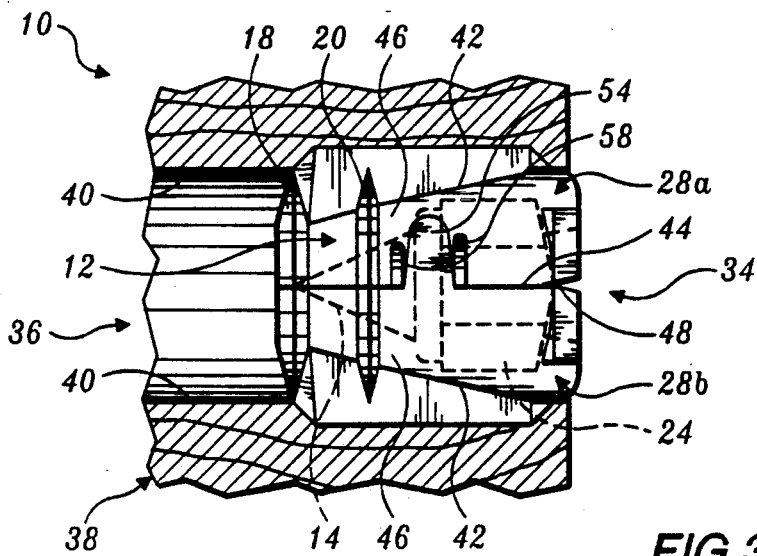
FIG. 3 is a side view of the fastening device of FIG. 1.
Figure 4:
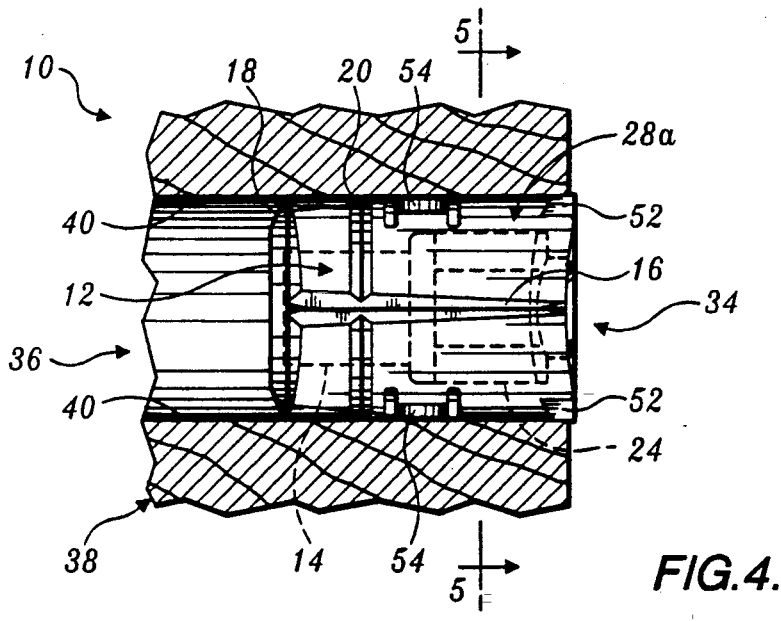
FIG. 4 is a top view of the fastening device of FIG. 1.
Figure 5:
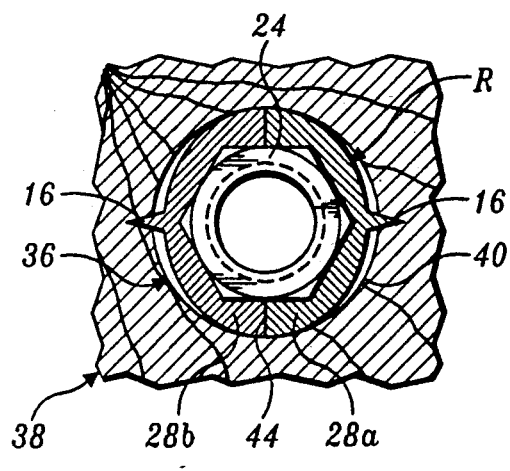
FIG. 5 is a sectional view of the fastening device of FIG. 1, taken along the direction 5—5 in FIG. 4.

Additional structural features of the fastening device 10 can be understood with reference to FIGS. 3-5, which illustrate an unexpanded fastening device 10 inserted in a bore 36 of a wooden base member 38. As can be seen in FIGS. 3 and 4, the diameter of primary tooth 18, secondary tooth 20 and the end 34 of fastener body 12 are each substantially equal to the diameter of bore 36. As also can be seen in both FIGS. 3 and 4, the fins 16 extend along the entire length of fastener body 12. As is clearly shown in FIG. 3 and 5, the fins 16 are diametrically opposed from one another about the periphery of the fastener body 12 and penetrate wall 40 of bore 36 so that each fin 16 extends into wooden base member 38. Extension of the fins 16 into wooden base member 38 prevents rotation of fastener body 12 during portions of the installation process in which the fastener body 12 is expanded to firmly embed fastening device 10 in base member 38. To minimize the stress created in base member 38 and thus minimize the risk of cracking or splitting, fins 16 are positioned substantially in line with the grain of base member 38.

When viewed perpendicular to fins 16 (FIG. 3), the boundary edges 42 of fastener body 12 taper inwardly from a diameter substantially equal to the diameter of bore 36 (at end 34 of fastening body 12) to a smaller dimension at the root of primary tooth 18. When viewed perpendicular to the part line 44 that separates body section 28a from body section 28b (FIG. 4), fastener body 12 exhibits a relatively low degree of taper between end 34 and primary tooth 18. The difference between the appearance of fastener body 12 in FIGS. 3 and 4 results because the surface 46 of fastener body 12 is substantially ellipsoidal. That is, each orthogonal section along the length of fastener body 12 is substantially elliptical with the oppositely disposed fins 16 extending outwardly in coincidence with the minor axis of the ellipse.

As is indicated by FIG. 5, the cross sectional shape (periphery) of fastener body 12 differs slightly from an ellipse in that the periphery of each body section 28a and 28b that defines the outline of fastener body 12 is a circular arc of radius R. Although the radius (R) of the arc that defines the surface of each body section 28a and 28b remains constant along the length of the body section, the chord length (and hence arc length) decreases with increasing distance from end 34 of fastener body 12. This decrease in arc length imparts the geometry of fastener body 12 that was described relative to FIG. 3 (i.e., defines the inwardly tapering boundary edges 42).

As shall be recognized upon understanding the manner in which the fastening device 10 is expanded into bore 36, the decrease in arc length along body sections 28a and 28b establishes the height dimension of both primary tooth 18 and secondary tooth 20. Moreover, the decrease in arc length or "taper" configures surface 46 so that substantially all of surface 46 is forced into abutment with wall 40 of bore 36 when the fastening device is expanded in bore 36.

When fastener body 12, wedge 14, and nut 24 have been installed in bore 36 in the manner depicted in FIGS. 3 and 4, bolt 26 is first passed through a suitably sized opening in the component part being mounted to the base member 38 (47 in FIGS. 6 and 7) and then is inserted into aperture 32 and engaged with the threads of nut 24. The fins 16 prevent rotation of the fastening device 10 as the bolt 26 engages the locking feature of the nut 24. Rotation of bolt 26 causes the end of the bolt to come into abutment with the end face of wedge 14. As rotation of bolt 26 continues, wedge 14 is driven outwardly from between the two body sections 28a and 28b. As bolt 26 drives wedge 14 outwardly, the distal ends of body sections 28a and 28b are forced toward wall 40 of bore 36 thus causing penetration of bore wall 40 by the primary tooth 18 and secondary tooth 20. The fins 16 also penetrate into the bore wall 40 as the sections 28a and 28b are forced apart. It is noted, however, that the primary function of the fins is to prevent rotation of the fastening device as the bolt 26 engages the nut 24 and not to secure the device to the base member 38.

Figure 6:
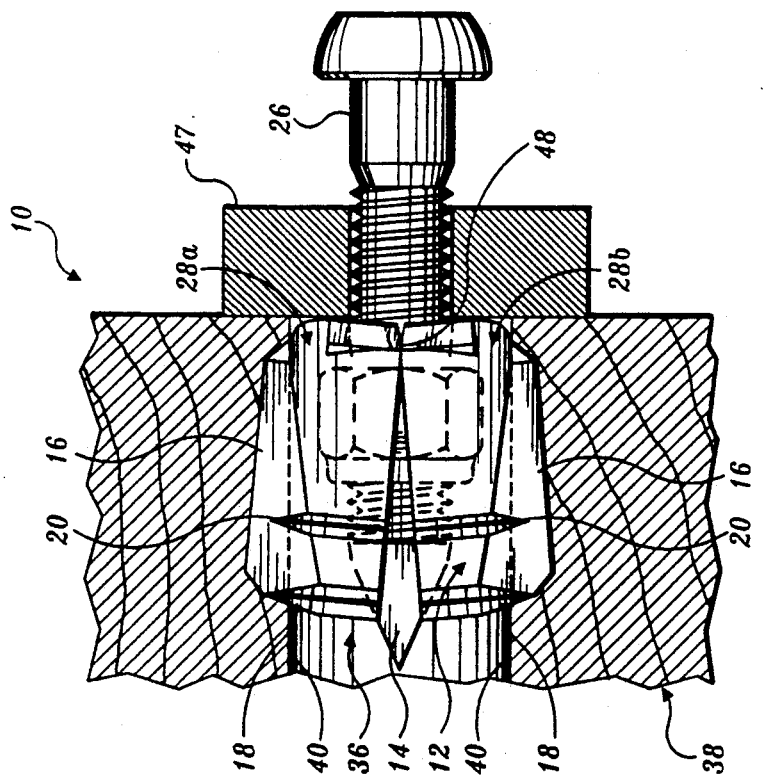
FIG. 6 is a side view of the fastening device of FIG. 1 shown partially installed in a base member.

As can be seen in FIG. 6, the contact region 48 between body sections 28a and 28b of fastener body 12 in effect serves as a bearing surface as the distal ends of body sections 28a and 28b are arcuately swung toward the bore wall 40 by advancement of wedge 14. In the preferred embodiments of the invention, contact region 48 is configured to facilitate a small amount of rocking motion as wedge 14 spreads the distal ends of body sections 28a and 28b apart from one another. For example, as is most clearly shown in FIG. 1, the contact region 48 of the currently preferred embodiments of the invention is a V-shaped groove 50 that is formed by beveling the transverse edges of body sections 28a and 28b at end 34 of fastener body 12.

Figure 7:
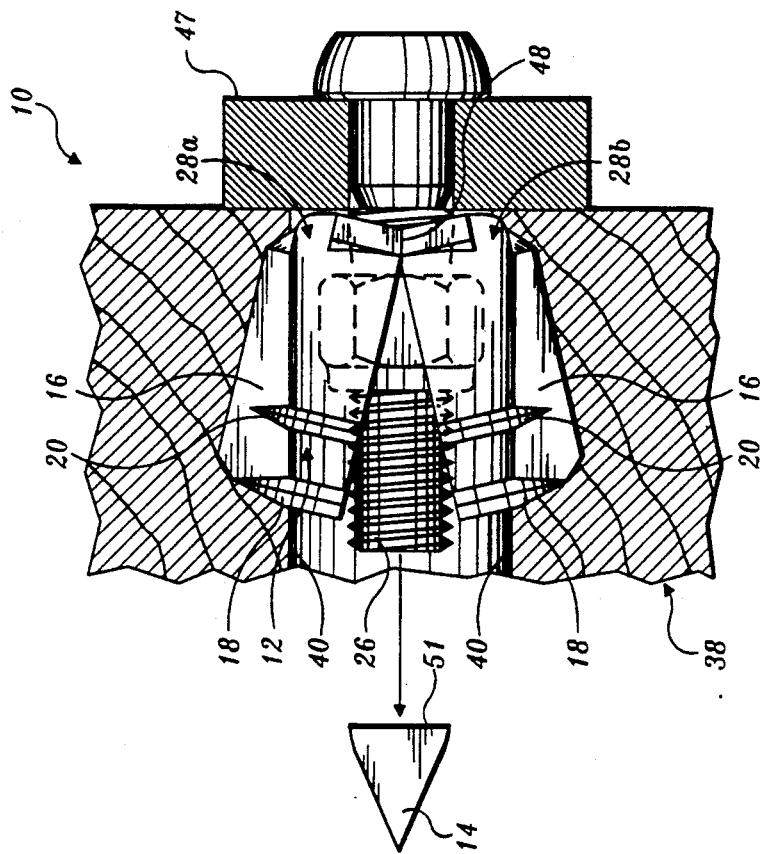
FIG. 7 is a sectional view of the fastening device of FIG. 1 shown fully installed within a base member.

As shown in FIG. 7, rotation of bolt 26 by an amount sufficient to drive wedge 14 from between body sections 28a and 28b fully embeds the primary and secondary teeth 18 and 20 in base member 38. As previously described, the radius of exterior surface 46 of body sections 28a and 28b (R in FIG. 5), is substantially equal to the radius of bore 36 in base member 38. Thus, substantially the entire surface of body sections 28a and 28b is urged against wall 40 of bore 36 when the fastening device 10 is fully expanded (FIG. 7).

Since the fastening device 10 is fully expanded as wedge 14 passes from between body sections 28a and 28b, it can be recognized that the face 51 of wedge 14 that contacts bolt 26 is dimensioned in accordance with the dimensioning and contouring of fastener body 12. In particular, wedge 14 preferably is dimensioned to achieve the above-mentioned relationship in which body sections 28a and 28b press firmly against the wall 40 of bore 36. As can be seen in FIGS. 6 and 7, the upper and lower surfaces of the wedge nearest the face 51 are slightly curved to allow the wedge to more easily pass between body sections 28a and 28b. Further, the height of the face 51 is at least equal to the diameter of the bolt 26 to allow the bolt to pass between the body sections 28a and 28b.

The currently preferred embodiments of the invention include additional features that further enhance the performance characteristics of the invention. First, as is shown in FIGS. 2-7, fins 16 and primary and secondary teeth 18 and 20 are of a triangular cross sectional geometry to thereby define edges that readily penetrate wall 40 of bore 36 when the fastening device 10 is being expanded. Preferably, the two faces of each fin and each tooth meet at an acute angle that is bisected by the centerline of the fin or tooth. In these embodiments, designed for use with a base material of relatively soft wood, it has been found that an angle of inclusion on the order of 30° provides an edge that readily penetrates a soft wood while simultaneously resulting in fins and teeth of sufficient strength.

It also has been found that the triangular cross sectional geometry of the teeth of FIGS. 2-7 is advantageous over triangular cross sectional geometry in which one face of a tooth 18 or 20 extends orthogonally outward from fastener body 12 and the second face forms an acute angle with the first face of each tooth. Specifically, the latter geometry tends to draw the fastener body 12 more deeply into bore 36 or push it outwardly from the bore (depending upon which face of the primary and secondary teeth 18 and 20 is orthogonal to fastener body 12).

The currently preferred embodiments of the invention also are configured to prevent the fastening device 10 from being driven too deeply within a bore 36 when fastener body 12 is initially inserted in a base member 38. In this regard, as is most clearly depicted in FIG. 1, fastener body 12 is configured so that a portion of end 34 will extend beyond wall 40 of bore 36 and, thus, will contact the face of base member 38 when the fastening device 10 is installed in the manner described relative to FIGS. 3-7. In the particular arrangement shown in FIG. 1, end 34 of fastener 12 includes four radially extending regions 52 that project outwardly from fastener body 12. In this arrangement, the four outwardly extending regions 52 are substantially triangular in geometry and are circumferentially spaced apart around the periphery of end 34 to form a rectangular pattern.

A third feature that is included in the currently preferred embodiments of the invention allows the fastening device 10 to be assembled and held together for installation in a suitably size opening (e.g., bore 36 of FIGS. 3-7). More specifically, and as is shown in FIGS. 1-4, a tabular region 54 is centrally located along each longitudinal edge of body section 28b and projects tangentially away from body section 28b. Located along each longitudinal edge of body section 28a is a recess 56 for receiving one of the tabular regions 54 of body section 28b. As is most clearly shown in FIG. 1, the recess 56 is partially defined by two parallel, spaced apart ridges 58 that are formed in the surface of body section 28a.

As can be understood in view of FIGS. 1 and 2, when body sections 28a and 28b are assembled with wedge 14 and nut 24, tabular regions 54 can be deformed inwardly to maintain fastening device 10 as a single assemblage. Holding the components of fastening device 10 together allows the fastening device to be preassembled for subsequent use in the field. Moreover, body sections 28a and 28b of fastening device 10 are thereby maintained in longitudinal registration with one another when the fastening device 10 is driven into a suitably sized opening (e.g., bore 36 of FIGS. 3 and 4). As wedge 14 is driven outwardly from between body sections 28a and 28b in the previously described manner, the tabular regions are forced apart from one another to allow movement of the distal ends of body sections 28a and 28b toward wall 40 of bore 36.

In view of the above-described structural features, it can be recognized that the invention provides an advantageous combination of features. First, the primary and secondary teeth 18 and 20 and the surface contour of fastener body 12 firmly retain an expanded fastening device 10 in all types of wood and other material. In this regard, fastening device 10 is expanded so that the outer surface of body sections 28a and 28b assert a controlled amount of radial pressure on the wall 40 of bore 36, which firmly embeds the primary and secondary teeth 18 and 20 in base member 38. Embedded in this manner, primary and secondary teeth 18 and 20 prevent the fastening device 10 from being pushed further into the bore or withdrawn from the bore.

As a further feature, the above-described high strength fastening characteristics are achieved while simultaneously minimizing the amount of internal stress that is created within the base member 38. As previously described, fin 16, primary tooth 18 and secondary tooth 20 are configured to readily penetrate the wall 40 of bore 36. Moreover, the two oppositely disposed fins 16 of the currently preferred embodiments of the invention allow the fins 16 to be aligned with the grain direction of a wooden base member during the initial steps of the fastening device installation procedure. Further, the structural arrangement of the invention prevents expansion of the fastening device to a degree that will exert excess radial pressure on the base member in which the device is installed. Specifically, with reference to the disclosed embodiments, the dimensions of the wedge 14 determine the maximum amount of expansion that can be obtained. In particular, once wedge 14 passes from between body sections 28a and 28b, no further expansion occurs. Thus, the person installing a fastening device 10 need not be concerned about over tightening the bolt 16 and thereby cracking or splitting the base member in which the device is installed. Even further, since the preferred embodiments of the invention are dimensioned and arranged so that wedge 14 passes from between body sections 28a and 28b, it is not necessary for an installer to use a bolt 26 of a specified length. That is, if bore 36 is of sufficient depth, the bolt 26 can extend substantially beyond the distal end of fastening device 10.

A further feature of the fastening device 10 is that it utilizes a conventional nut 24 to provide resistance against vibration of the bolt 26 from the device. In contrast, including threads and a locking mechanism within the fastening device itself would be costly and inefficient to manufacture.

As an example of the relative dimensions of a fastening device 10, a realization of the currently preferred embodiments for use with a one-half inch bolt has a length of one and one-half inches and is installed in a one and one-eighth inch diameter bore in a relatively soft wood base member. In this realization, the wedge 14 is dimensioned to force the body sections 28a and 28b apart so that each body section forms an angle of approximately 12° with the longitudinal centerline of the bore in which the fastening device is installed. Each tooth 16 of this realization extends one-eighth inch into the base member when the fastening device is initially inserted in the base member (in the manner shown in FIGS. 3 and 4). When installed in a relatively soft wooden base member and fully expanded in the manner described relative to FIGS. 6 and 7, approximately 3,000 pounds of pressure must be asserted to pull the fastener 10 from the base member.

Each component of the above-discussed realization of the invention is die case from zinc in a manner that is known in the art. Preferably, the component parts are subjected to a conventional tumbling process to reduce surface roughness and remove any rough edges. Typically, the fluid used in the tumbling process provides a lubricating residue and reduces the torque required during installation of the fastening device 10. In the absence of a lubricating residue, or as a supplement to such a residue, a grease or wax can be applied to the wedge 14 or cavity 30 prior to installing the fastening device.

Those skilled in the art will recognize that the disclosed embodiments are exemplary in nature and, thus, various changes and modifications can be made without departing from the scope and the spirit of the invention. Accordingly, the invention should be interpreted solely by reference to the following claims.

The embodiments of the invention in which an exclusive property or privilege is claimed are defined as follows:

1. An expansible fastening device for placement in a hole preformed in a base member, the fastening device for attaching at least one component part to the base member using a nut and bolt arrangement, the fastening device comprising a fastener body having two longitudinal sections and a wedge for use in separating the sections at a first end thereof, the sections when positioned together forming an inner cavity to house the nut and wedge and further forming an aperture therethrough to the cavity, each section including an outer surface having a fin and at least two spaced-apart teeth, the fin extending longitudinally and the teeth extending circumferentially along the outer surface of the sections whereby rotational movement of the bolt within the nut forces the wedge between the sections expanding the sections at said first end to drive the teeth into the base member and the outer surface against the surface of the hole in the base member upon displacing the wedge from the fastening device.

2. The expansible fastening device of claim 1 wherein the wedge includes a rectangularly-shaped face having a height at least equal to the diameter of the bolt.

3. The expansible fastening device of claim 1, including means for releasably connecting the longitudinal sections to one another prior to inserting the fastening device into the preformed hole in the base member.

4. The expansible fastening device of claim 3, wherein each section includes means for preventing the fastening device from being driven too deeply into the preformed hole of the base member.

5. The expansible fastening device of claim 4, wherein the fastener body, excluding the fins and teeth, is substantially cylindrical in shape when the fastening device is fully expanded.

6. The expansible fastening device of claim 1, wherein the teeth are circular prior to expansion of the device and exhibit a diameter substantially equal to the diameter of the hole in which the fastening device is to be installed.

7. The expansible fastening device of claim 1 wherein the nut includes a locking feature to provide resistance against vibration of the bolt out of the nut.

8. A fastening device to be used in conjunction with a nut and bolt, comprising a wedge and two substantially identical body sections which are positioned together to form a central cavity to enclose the nut and wedge, the periphery of each body section being a circular arc which substantially corresponds to a semicircle at a first end of the fastening device, the arc length of the periphery of each body section decreasing as the body sections extend toward a second end of the fastening device, each body section including a fin which extends longitudinally along and projects radially outward from the body section, each body section further including at least one circumferentially extending flange near the second end of the fastening device the fastening device exhibiting an unexpanded configuration in which the body sections are placed together prior to being placed in a bore in a base member and an expanded configuration in which the fastening device is secured through rotational movement of the bolt within the nut, the central cavity and wedge being dimensioned such that rotational movement of the bolt within the nut expands the fastening device by displacing the wedge from the fastening device through the second end.

9. The fastening device of claim 8, wherein the periphery of each flange that extends from a body section substantially corresponds to a semicircle having a radius that is substantially equal to the radius of the circular arc of the body sections.

10. The fastening device of claim 9, wherein the radius of the circular arc of the body sections is substantially equal to the radius of the bore in the base member.

11. The fastening device of claim 8 wherein the nut includes a locking feature to provide resistance against vibration of the bolt out of the nut.

12. The fastening device of claim 8, including means for releasably connecting the body sections to one another prior to inserting the fastening device into the bore of the base member.

13. The fastening device of claim 8, wherein the body sections include means for preventing the fastening device from being driven too deeply into the bore of the base member.

14. The fastening device of claim 8, wherein the radius of the circular arc of the body sections is equal to the radius of the bore in the base member.

15. The fastening device of claim 8 wherein the wedge includes a rectangularly-shaped face having a height at least equal to the diameter of the bolt.

* * * * *